United States Patent
Yang

(10) Patent No.: US 8,119,937 B2
(45) Date of Patent: Feb. 21, 2012

(54) CAPACITIVE TOUCH PANEL

(75) Inventor: Kai-Ti Yang, Taoyuan (TW)

(73) Assignee: Young Fast Optoelectronics Co., Ltd., Taipei (TW)

( * ) Notice: Subject to any disclaimer, the term of this patent is extended or adjusted under 35 U.S.C. 154(b) by 1017 days.

(21) Appl. No.: 12/045,697

(22) Filed: Mar. 10, 2008

(65) Prior Publication Data

US 2009/0223722 A1 Sep. 10, 2009

(51) Int. Cl.
*G06F 3/041* (2006.01)
(52) U.S. Cl. ..................... 178/18.06; 345/173
(58) Field of Classification Search .................. 345/156, 345/173; 178/18.01, 18.06; 324/658, 686; 715/700
See application file for complete search history.

(56) References Cited

U.S. PATENT DOCUMENTS

| 7,202,859 B1 * | 4/2007 | Speck et al. ................... 345/174 |
| 7,477,242 B2 * | 1/2009 | Cross et al. ................... 345/179 |
| 7,737,953 B2 * | 6/2010 | Mackey ........................ 345/173 |
| 7,874,923 B2 * | 1/2011 | Mattice et al. ................. 463/46 |

* cited by examiner

*Primary Examiner* — Abbas Abdulselam

(57) ABSTRACT

A capacitive touch panel, comprises a surface layer, an X axis sensing layer, a Y axis sensing layer, an insulation layer, a base substrate and a first signal output wire bank; wherein the surface layer and the bottom layer are high light transmission insulating films; the material of X axis sensing layer and Y axis sensing layer are selected from a transparent film with good conductivity and low impedance; the material of the insulation layer connected the X axis sensing layer and Y axis sensing layer being selected from transparent insulating film material; a plurality of conductive wires are arranged on the first signal output wire bank; and the X axis sensing layer has a plurality of X line traces and the Y axis sensing layer has a plurality of Y line traces.

3 Claims, 3 Drawing Sheets

CAPACITIVE TOUCH PANEL

FIELD OF THE INVENTION

The present invention relates to touch panels, and particularly to a capacitive touch panel which is arranged before a display screen so that the user can input by touching. The present invention provides a clear image for the screen.

BACKGROUND OF THE INVENTION

The touch panels are widely used in various electronic devices. In general, the touch panels can be divided into three kinds, one is capacitive touch panels, another is resistive touch panels and the other is electromagnetic touch panels. Every kind of panel has its advantages and thus they are used in different fields, for example the resistive touch panels are used in personal digital assistants (PDAs), electronic dictionaries, handsets, MP3s, digital players, or global positioning systems (GPSs), or other small size electronic devices. The capacitive touch panels are mainly used in the notebooks, or virtual touch keyboards, etc.

Moreover, the capacitive touch panel includes an X axis sensing layer (X trace) and a Y axis sensing layer (Y trace). The X axis sensing layer and Y axis sensing layer are isolatedly installed in a touch plate. The X axis sensing layer and Y axis sensing layer are grounded individually and are connected to a control circuit. In operation, when a finger touches upon a surface of the touch panel, a capacitive effect will generate. A control circuit will assure the touch position of the finger or conductor by the variation of the capacitor. The capacitive touch panel can be inputted by fingers so that it is convenient in operation. Moreover, in data input operation, no pressure is applied and thus no over larger stress is applied to the touch panel and thus the panel will not deform. Further, the capacitive touch panel is made of less components with a simple structure. The yield ratio is high and it is suitable for mass production. Furthermore, the touch panel can sense the input operations in multiple points. That is, it is suitable for multiplex operation and is also suitable for high level operation, such as electronic games, which makes the operation objects being more active and vivid. However this kind of capacitive touch panel still has many defects necessary to be improved. For example, the capacitive touch panel is easily interfered by electromagnetic waves so as to induce noises and thus the input signals will be adjudged incorrectly, even the fault operation is induced. Besides, the sensitivity of the finger input is low, particular to the input of texture, such as Chinese characters. Although dedicated pens are designed for improving above mentioned defects, it is still not suitable for being used in a small area touch panel with higher precision. Furthermore, the use of dedicated pen is also inconvenient in many fields, for example the pen is not carried out or the pen is lost. Furthermore, the dedicate sensing pen is not inconvenient in many situations. For example when the user do not carry the pen or the pen is lost. Recently, the capacitive touch panel unit is made of PET or other transparent material as a substrate which is used with low impedance conductive material (such as silver glue) as a sensing layer so as to form a transparent capacitive touch panel unit so that it is suitable to be arranged in front of a electronic display screen for inputting by users. However in this prior art, the silver glue is not complete transparent. Furthermore, the sensing layer thereof is formed as latticed traces. As a result, the traces and non-trances in sensing layer (i.e., hollowed portion) have different transparency. Thus, light from the screen experience different diffraction so as to cause that the image is blurred or distort.

Therefore, from above description, it is known that the capacitive touch panel and resistive touch panel unit have their intrinsic defects which are necessary to be improved.

SUMMARY OF THE INVENTION

Accordingly, the primary object of the present invention is to provide a capacitive touch panel capacitive touch panel which is arranged before a display screen so that the user can input by touching. The present invention provides a clear image for the screen.

To achieve above objects, the present invention provides a capacitive touch panel, comprises a surface layer, an X axis sensing layer, a Y axis sensing layer, an insulation layer, a base substrate and a first signal output wire bank; wherein the surface layer and the bottom layer are high light transmission insulating films; the material of X axis sensing layer and Y axis sensing layer are selected from a transparent film with good conductivity and low impedance; the material of the insulation layer connected the X axis sensing layer and Y axis sensing layer being selected from transparent insulating film material; a plurality of conductive wires are arranged on the first signal output wire bank, and the X axis sensing layer has a plurality of X line traces and the Y axis sensing layer has a plurality of Y line traces; the X directional line traces are vertical to the Y directional line traces; one end of the X transparent line trace has an X joint and one end of the Y transparent line trace has a Y joint.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
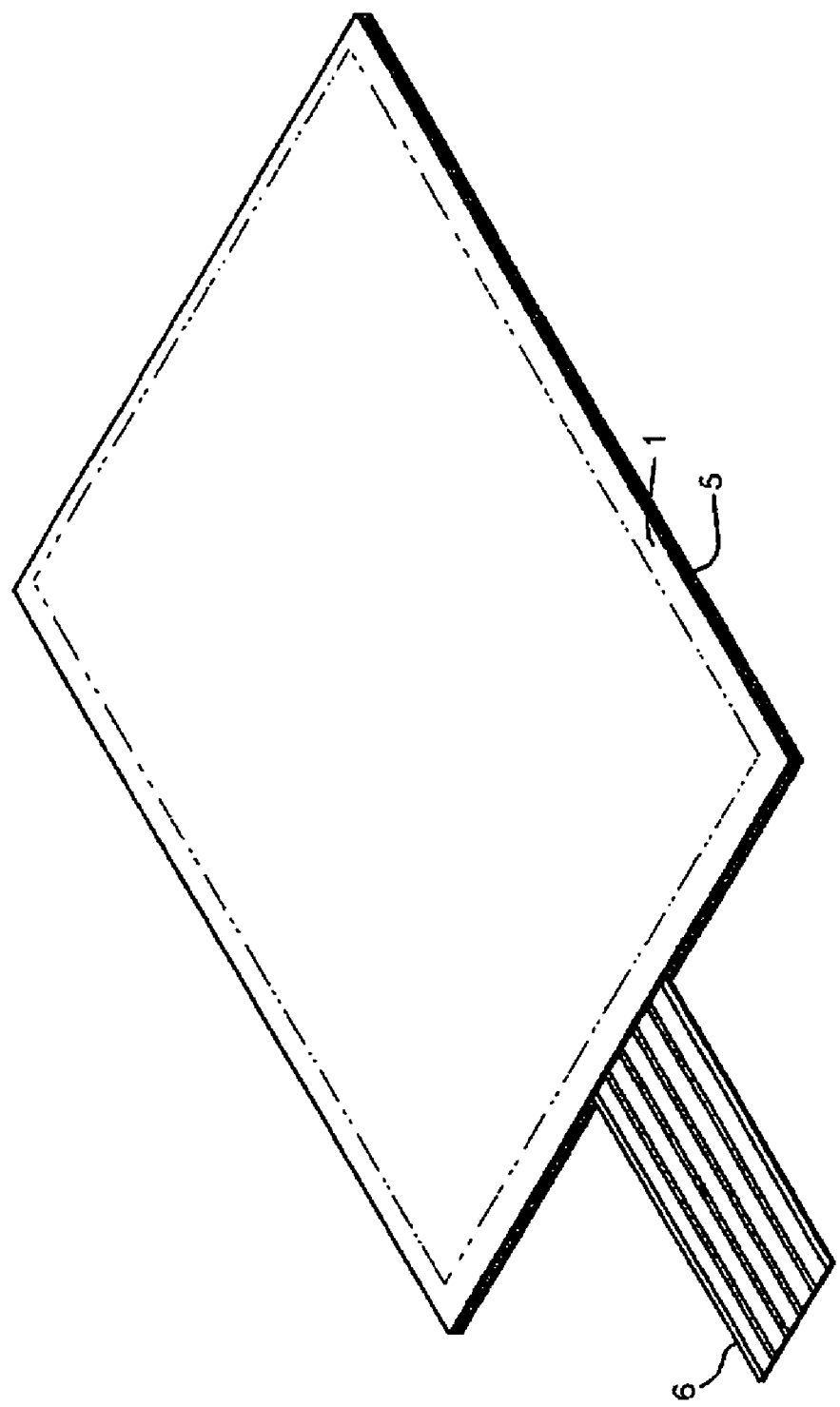
FIG. 1 is a structural perspective view of the present invention.
Figure 2:
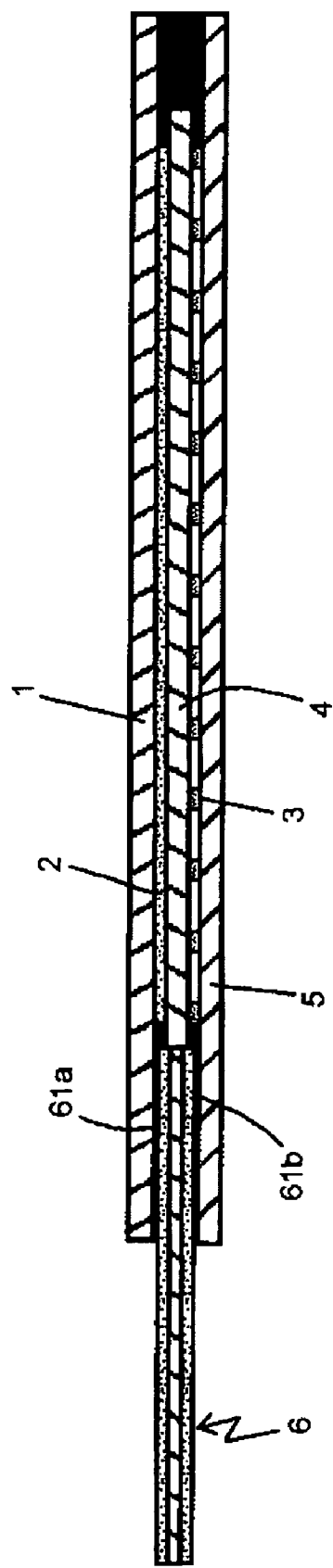
FIG. 2 is a schematic cross sectional view of the present invention.
Figure 3:
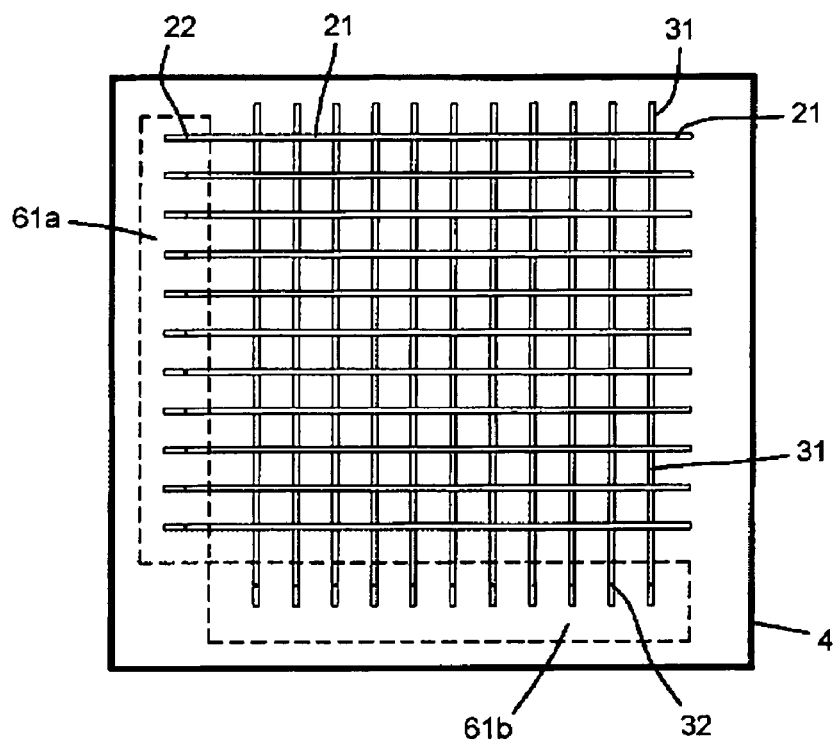
FIG. 3 is schematic view showing the line traces in the layer 2 and 3 of the present invention.

Referring to FIGS. 1 to 3, the preferred embodiment of the present invention is illustrated. The present invention has the following elements. A capacitive touch panel unit 1 has a surface layer 1, an X axis sensing layer 2, a Y axis sensing layer 3, an insulation layer 4, a base substrate 5 and a first signal output wire bank 6. The surface layer 1 and the bottom layer 5 are high light transmission insulating films, such as glass, Polycarbonate (PC), Polythylene terephthalate (PET), polymethylmethacrylate (PMMA), or Cyclic Olefin Copolymer. The material of X axis sensing layer 2 and Y axis sensing layer 3 may be selected from a transparent film with good conductivity and low impedance, such as material of indium tin oxide (ITO) film. The material of the insulation layer 4 connected the X axis sensing layer 2 and Y axis sensing layer 3 is selected from transparent insulating film material with a dielectric coefficient between 2 to 4, such as oily ink or high transparency polyester films. The material of the first signal output wire bank 6 is selected from flexible printed circuit (FPC) boards. A plurality of conductive wires are arranged on the first signal output wire bank 6. All above mentioned layers can be glued together as a transparent body.

Referring to FIGS. 2 and 3, the X axis sensing layer 2 has a plurality of X line traces 21 with a width between 0.05 and 5 mm and the Y axis sensing layer 3 has a plurality of Y line traces 131 with a width between 0.05 and 5 mm. The X directional line traces 21 are vertical to the Y directional line traces 31. One end of the X transparent line trace has an X Joint 22 and one end of the Y transparent line trace 31 has a Y joint 32. All the X joints 22 are between to an X silver conductor 61a and all the Y joints 32 are connected to a Y silver conductor 61b. The signals of the X axis sensing layer 2 and Y axis sensing layer 3 are transferred to the first signal output wire bank 6 and then to a signal processing unit (not shown).

In above mentioned structure, an equivalent capacitor is formed between the X axis sensing layer 12 and the X silver conductor 61a and an equivalent capacitor is formed between the Y axis sensing layer 3 and the Y silver conductor 61b. Then a finger touches through a surface of a touch panel. By the variation of capacitor, the signal processing circuit will determine the touch position of the finger from the variation of capacitor. Thus the transparent touch panel according to the present invention can be installed before a display screen of an electronic device so that the user can input through the touch panel. Furthermore, the capacitive touch panel of the present invention has a function of multi-points sensing, that is, it has the function of multiplexing control so that it can be used to a high level control. For example, using to a control of an electric game machine so that the virtual object in the game is more vivid. Moreover, The X line traces 21 and Y line traces 31 are vertical to one another as a lattice and have small widths. Thus, the arrangement is in order. Therefore, the whole touch plate has a uniform transparency. The screen of the touch panel will not distort.

Figure 4:
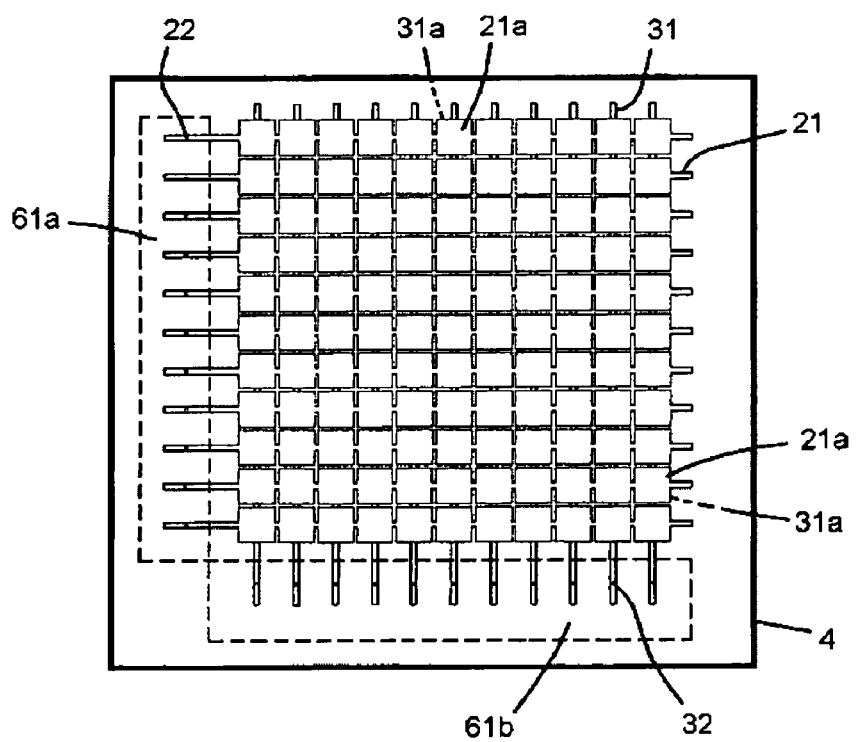
FIG. 4 is a schematic view showing the in traces in the layers 2 and 3 of the present invention in another embodiment.

Moreover, referring to FIG. 4, the connections of the X line traces 21 and Y line traces 31 can be formed with enlarged sensing surfaces 21a, 31a for reducing the non-line trace area in the touch panel. Thereby the display screen of the touch panel has a uniform transparency and the image distortion in the touch panel is reduced so that the sensitivity and precision of the touch panel is increased.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A capacitive touch panel, comprising:
a surface layer, an X axis sensing layer, a Y axis sensing layer, an insulation layer, a base substrate and a first signal output wire bank;
wherein the surface layer and the bottom layer are high light transmission insulating films; the material of X axis sensing layer and Y axis sensing layer are selected from a transparent film with good conductivity and low impedance; the material of the insulation layer connected the X axis sensing layer and Y axis sensing layer being selected from transparent insulating film material; a plurality of conductive wires are arranged on the first signal output wire bank;
the X axis sensing layer has a plurality of X line traces and the Y axis sensing layer has a plurality of Y line traces; the X directional line traces are vertical to the Y directional line traces; one end of the X transparent line trace has an X joint and one end of the Y transparent line trace has a Y joint; and
the material of the insulation layer connected the X axis sensing layer and Y axis sensing layer are selected from transparent insulating film material with a dielectric coefficient between 2 to 4, and oily ink and high transparency polyester films.

2. The capacitive touch panel as claimed in claim 1, wherein all the X joints are connected to an X silver conductor and all the Y joints are connected to a Y silver conductor; the signals of the X axis sensing layer and Y axis sensing layer are transferred to the first signal output wire bank and then to a signal processing unit.

3. The capacitive touch panel as claimed in claim 1, wherein the high light transmission insulating films selected from glass, Polycarbonate (PC), Polythylene terephthalate (PET), polymethylmethacrylate (PMMA), and Cyclic Olefin Copolymer.

* * * * *